(12) United States Patent
Kellner et al.

(10) Patent No.: US 11,888,137 B2
(45) Date of Patent: Jan. 30, 2024

(54) HIGH-VOLTAGE BATTERY HAVING A PLURALITY OF BATTERY MODULES AND HEAT SINKS

(71) Applicant: Dr. Ing. h.c. F. Porsche Aktiengesellschaft, Stuttgart (DE)

(72) Inventors: Philipp Kellner, Rennigen (DE); Sascha Mostofi, Zeltingen (DE); Christopher Volkmer, Niefern-Öschelbronn (DE); Dieter Schiebel, Korntal-Münchingen (DE); Immanuel Vogel, Kornwestheim (DE); Adrian Starczewski, Korntal-Münchingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 157 days.

(21) Appl. No.: 17/480,290

(22) Filed: Sep. 21, 2021

(65) Prior Publication Data

US 2022/0131211 A1 Apr. 28, 2022

(30) Foreign Application Priority Data

Oct. 27, 2020 (DE) ..................... 10 2020 128 174.9

(51) Int. Cl.
*H01M 10/6557* (2014.01)
*H01M 50/204* (2021.01)
*H01M 10/6567* (2014.01)
*H01M 10/613* (2014.01)
*H01M 10/6551* (2014.01)

(52) U.S. Cl.
CPC ..... *H01M 10/6557* (2015.04); *H01M 10/613* (2015.04); *H01M 10/6551* (2015.04); *H01M 10/6567* (2015.04); *H01M 50/204* (2021.01)

(58) Field of Classification Search
CPC .......... H01M 10/6557; H01M 10/613; H01M 10/6551; H01M 10/6567; H01M 50/204
See application file for complete search history.

(56) References Cited

U.S. PATENT DOCUMENTS

2009/0325051 A1 12/2009 Niedzwiecki et al.
2011/0033742 A1 2/2011 Maier et al.

FOREIGN PATENT DOCUMENTS

| DE | 102007012893 A1 * | 3/2008 | .......... B60L 11/1874 |
| DE | 102008014155 A1 | 9/2009 | |
| DE | 102009013651 A1 | 9/2010 | |
| DE | 102013216513 A1 * | 2/2015 | .......... F28D 1/05383 |
| DE | 102016001145 A1 | 8/2017 | |
| DE | 102017130261 A1 * | 6/2018 | ............... B60K 1/04 |
| GB | 2588768 A * | 5/2021 | .......... H01M 10/613 |

* cited by examiner

*Primary Examiner* — Jimmy Vo
(74) *Attorney, Agent, or Firm* — RatnerPrestia

(57) ABSTRACT

A high-voltage battery having a plurality of battery modules, coolant-carrying heat sinks for cooling the battery modules, a coolant supply line for supplying the coolant to the heat sinks via supply connections and discharge connections for discharging the coolant from the heat sinks to a coolant discharge line. In this high-voltage battery, the supply connections and the discharge connections respectively form a coolant distributor. The respective coolant distributor is connected to the heat sinks of the respective battery module.

20 Claims, 2 Drawing Sheets

HIGH-VOLTAGE BATTERY HAVING A PLURALITY OF BATTERY MODULES AND HEAT SINKS

CROSS-REFERENCE TO RELATED APPLICATION

This application claims priority to German Patent Application No. 10 2020 128 174.9, filed Oct. 27, 2020, the content of such application being incorporated by reference herein in its entirety.

FIELD OF THE INVENTION

The invention relates to a high-voltage battery having a plurality of battery modules, coolant-carrying heat sinks for cooling the battery modules, a coolant supply line for supplying the coolant to the heat sinks via supply connections and discharge connections for discharging the coolant from the heat sinks to a coolant discharge line.

BACKGROUND OF THE INVENTION

High-voltage batteries in fully or partially electric vehicles are typically cooled by means of a coolant, which is a liquid in particular.

A high-voltage battery is known from DE 10 2009 013 651 A1, which is incorporated by reference herein. In said high-voltage battery, a heat sink is respectively arranged between adjacent battery modules. The respective heat sink is connected to a coolant supply line via a supply connection, which has an associated throughflow-limiting element. A coolant discharge line is arranged in the region of that end of the respective heat sink which is averted from the coolant supply line. Coolant passes from the respective heat sink into the coolant discharge line directly via a discharge connection. Therefore, in this high-voltage battery, heat sinks are arranged on averted sides of the respective battery module, but they are each individually connected to the coolant supply line and the coolant discharge line. This is associated with considerable complexity in respect of construction and assembly and considerable costs.

DE 10 2016 001 145 A1, which is incorporated by reference herein, describes a battery module which has a respective cooling plate above and below a housing of the battery module. The housing has a feed-side coolant distributor and a return-side coolant distributor. The coolant distributors serve to divide the coolant between the two cooling plates or to combine the coolant flowing away from the cooling plates.

DE 10 2008 014 155 A1, which is incorporated by reference herein, describes a battery having a plurality of battery modules. Each battery module has a heat sink through which coolant flows.

SUMMARY OF THE INVENTION

Described herein is a high-voltage battery having a cost-effective connection, which is simple in terms of construction and from assembly standpoints, of the coolant supply line and coolant discharge line to the heat sinks in the region of the respective battery module is ensured.

In the high-voltage battery according to aspects of the invention, it is provided that the supply connections and the discharge connections are each designed as coolant distributors, wherein the respective coolant distributor is connected to the heat sinks of the respective battery module.

The respective coolant distributor therefore establishes the connection between the coolant supply line or the coolant discharge line and the heat sinks of the respective battery module.

From construction standpoints and from assembly standpoints, it is considered to be particularly advantageous when the respective coolant distributor is of one-part design. Therefore, it is only necessary to connect this coolant distributor to the heat sinks of the battery module and to the coolant supply line or to the coolant discharge line.

The coolant distributors and/or the coolant supply line and/or the coolant discharge line preferably consist/consists of plastic. When this material is used, the abovementioned components can be produced in a particularly simple manner.

From assembly standpoints, it is considered to be particularly advantageous when connection regions of the supply connections to the heat sinks and/or connection regions of the discharge connections to the heat sinks are arranged in the same spatial direction or the same spatial plane.

From assembly standpoints, it is considered to be particularly advantageous when the connection regions of the supply connections to the coolant supply line and/or connection regions of the discharge connections to the coolant discharge line are arranged in the same spatial direction or the same spatial plane.

In particular, it is provided that the connection regions of the supply connections and discharge connections to the heat sinks and also to the coolant supply line or coolant discharge line are arranged in the same spatial direction or spatial plane.

It is advantageous when the coolant distributors have a flexibly mounted connection region. Said connection region is located on the heat sink or on the coolant supply line or the coolant discharge line. Tolerances in the connection region can be readily compensated for by the respective flexibly mounted connection region.

From the aspect of particularly simple assembly, it is considered to be particularly advantageous when the coolant distributors are connected to the heat sinks and/or the coolant supply line and/or the coolant discharge line by means of plug-in connections. A connection of this kind can be established in a particularly simple and rapid manner, with optimum sealing off of the plugged-in components. Additional sealing elements may be provided if desired.

It is considered to be particularly advantageous when the heat sinks are arranged on averted sides of the respective battery module. Said averted sides are, in particular, averted main sides of the respective battery module. These main sides form the large surfaces of the battery module. In particular, the battery module is substantially in the form of a cuboid.

The respective battery module has, in particular, two heat sinks. When forming the substantially cuboidal battery modules, the two heat sinks extend, by way of their main sides, substantially in the same two spatial directions, therefore are arranged substantially parallel or parallel.

In terms of construction, it is considered to be particularly advantageous when the respective heat sink, through which coolant flows, is of plate-like design. This plate-like configuration provides an optimal heat-transfer surface to the battery module.

In particular, it is provided that the supply connections and the discharge connections of the respective battery module are arranged on averted sides of the battery module. In particular, all of the supply connections of the battery modules are arranged on the same side of the arrangement of the battery modules and all of the discharge connections of the battery modules are arranged on that side of the arrangement of battery modules which is averted from said side. This provides for particularly advantageous flow of coolant through the heat sinks of the high-voltage battery together with particularly homogeneous arrangement of the coolant distributors for coolant supply and coolant discharge, together with simple assembly of said coolant distributors.

In order to achieve particularly good heat transfer for the purpose of cooling the battery modules, it is provided, in particular, that the heat sinks of the respective battery module make surface-to-surface contact with said battery module.

In particular, the heat sinks of the respective battery module are connected to said battery module.

BRIEF DESCRIPTION OF THE DRAWINGS

Further features of the invention can be found in the dependent claims, the appended drawing and the description of two exemplary embodiments, shown in the drawing, without being restricted thereto.

In the drawing.

DETAILED DESCRIPTION OF THE INVENTION

Figure 1:
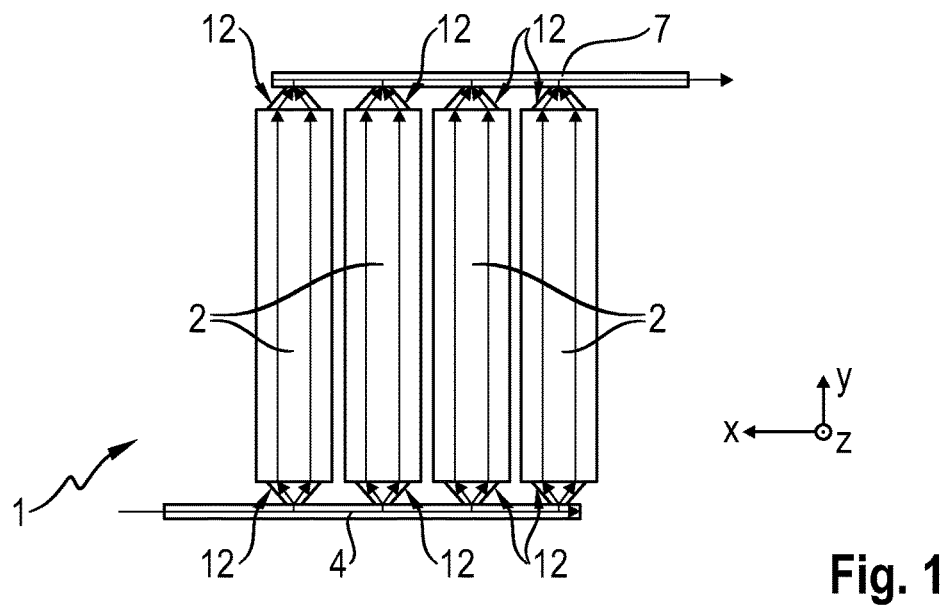
FIG. 1 shows, for the first exemplary embodiment in relation to a high-voltage battery, an arrangement of a plurality of battery modules and cooling components which interact with said battery modules, illustrated as seen in a view counter to a vehicle vertical direction z, with the upper heat sink removed.
Figure 2:
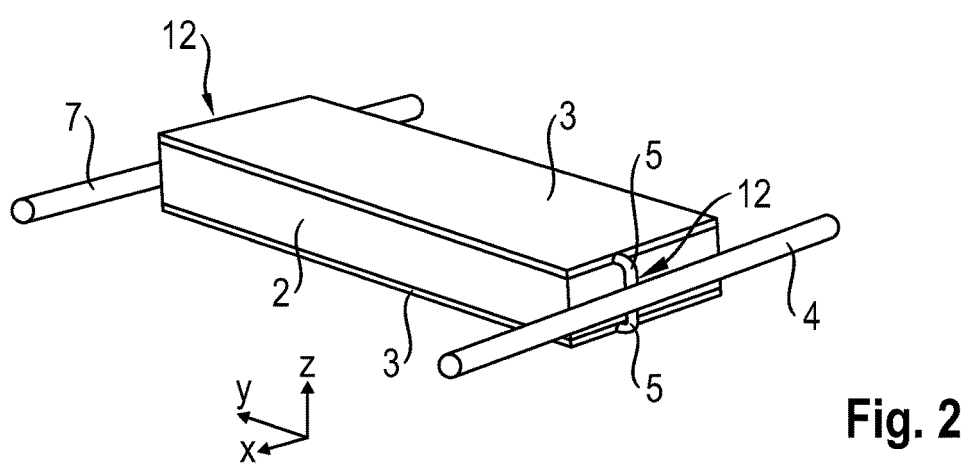
FIG. 2 shows, in relation to the arrangement illustrated in FIG. 1, a subregion of a battery module having the cooling components which interact with the battery module, illustrated in a three-dimensional illustration.
Figure 3:
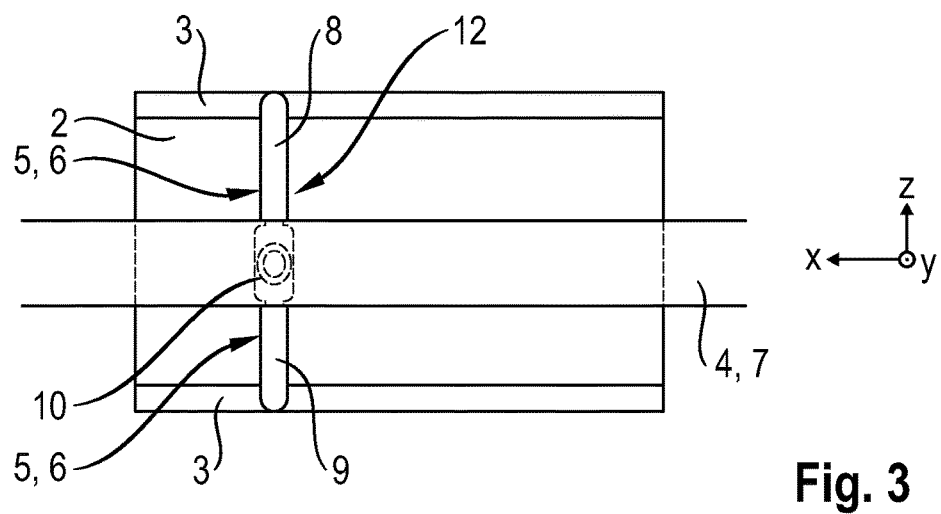
FIG. 3 shows the arrangement according to FIG. 2, in a view in the vehicle lateral direction y.

The first exemplary embodiment of the components of the high-voltage battery 1 that are relevant to the invention is illustrated in FIGS. 1 to 4. The high-voltage battery 1 installed in a vehicle, for example a passenger car, has a plurality of, specifically four, battery modules 2, coolant-carrying heat sinks 3 for cooling the battery modules 2, a coolant supply line 4 for supplying the coolant to the heat sinks 3 via supply connections 5 and discharge connections 6 for discharging the coolant from the heat sinks 3 to a coolant discharge line 7. Here, the components according to reference signs 3 to 7 form the cooling components.

The respective battery module 2 has a large number of battery cells, not illustrated. The battery module 2 is of cuboidal design, wherein the sides of the cuboid run in the vehicle longitudinal direction (forward direction of travel) x, vehicle lateral direction y and vehicle vertical direction z. The respective battery modules 2 are of identical design and are oriented in an identical manner with respect to said coordinates and here are arranged at a constant distance next to one another. The respective battery module 2 has a respective heat sink 3 on averted sides, with respect to the z-axis. The extent of the respective heat sink 3 in the x-y-plane corresponds to the extent of the battery module 2 in this plane. The extent of the respective heat sink 3 in the z-direction is substantially smaller than the extent of the respective battery module 2 in this direction. The respective heat sink 3, through which coolant flows, is of plate-like design.

The coolant is a cooling liquid.

The coolant supply line 4 and the coolant discharge line 7 each extend in the x-direction. They are arranged on averted sides of the battery modules 2, where a common coolant supply line 4 and a common coolant discharge line 7 are associated with all of the battery modules 2.

The supply connections 5 and the discharge connections 6 respectively form a coolant distributor 12. Here, the respective coolant distributor 12 is connected to the two heat sinks 3 of the respective battery module 2. Here, the supply connection 5 is connected to the two heat sinks 3 and the coolant supply line 4 in exactly the same way as the discharge connection 6 is connected to the two heat sinks 3 and the coolant discharge line 7.

Figure 4:
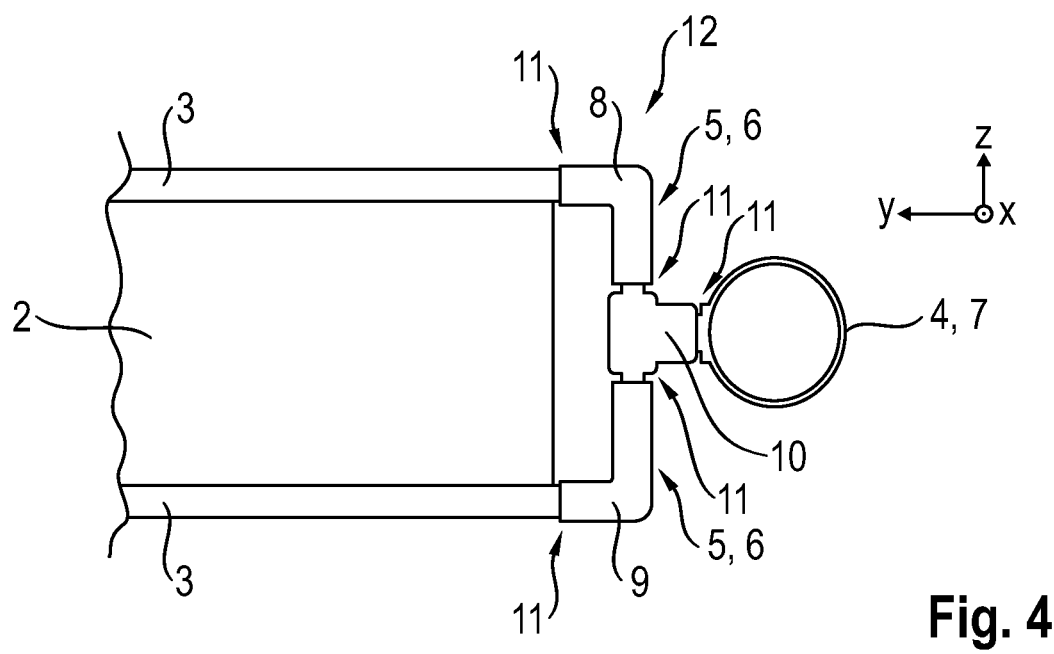
FIG. 4 shows the arrangement according to FIGS. 2 and 3, illustrated over a partial extent in the y-direction, as seen in a view counter to the vehicle longitudinal direction x, and therefore counter to the forward direction of travel of the vehicle.

In particular, the illustration in FIG. 4 shows that the respective supply connection 5 or discharge connection 6 is of multiple-part design, with two angled sections 8, 9 and a central section 10 arranged between them, wherein the angled sections 8, 9, in averted regions of the central section 10, are plug-mounted onto said central section and connected there in a sealing manner, and furthermore the angled section 8 is connected to the upper heat sink 3 and the angled section 9 is connected to the lower heat sink 3, in particular is likewise connected by means of a plug-in connection in a sealed-off manner. The central section 10 of the supply connection 5 is connected to the coolant supply line 4, in particular connected in a sealing manner by means of a plug-in connection. Accordingly, the discharge connection 6 is connected to the coolant discharge line 7 via a plug-in connection and in a sealed-off manner. The region of the respective plug-in connection is illustrated by reference numeral 11. The respective coolant distributor 12, the coolant supply line 4 and the coolant discharge line 7 consist of plastic.

The supply connection 5 and the discharge connection 6 are arranged perpendicularly to the extent of the coolant supply line 4 and the coolant discharge line 7, and therefore are arranged in a y-z-plane. The supply connection 5 and the discharge connection 6 can have a flexibly mounted connection region on the heat sink 3 or on the coolant supply line 4 or the coolant discharge line 7 in order to be able to compensate for tolerances.

The angled sections 8, 9 can also be designed entirely as a tube.

Figure 5:
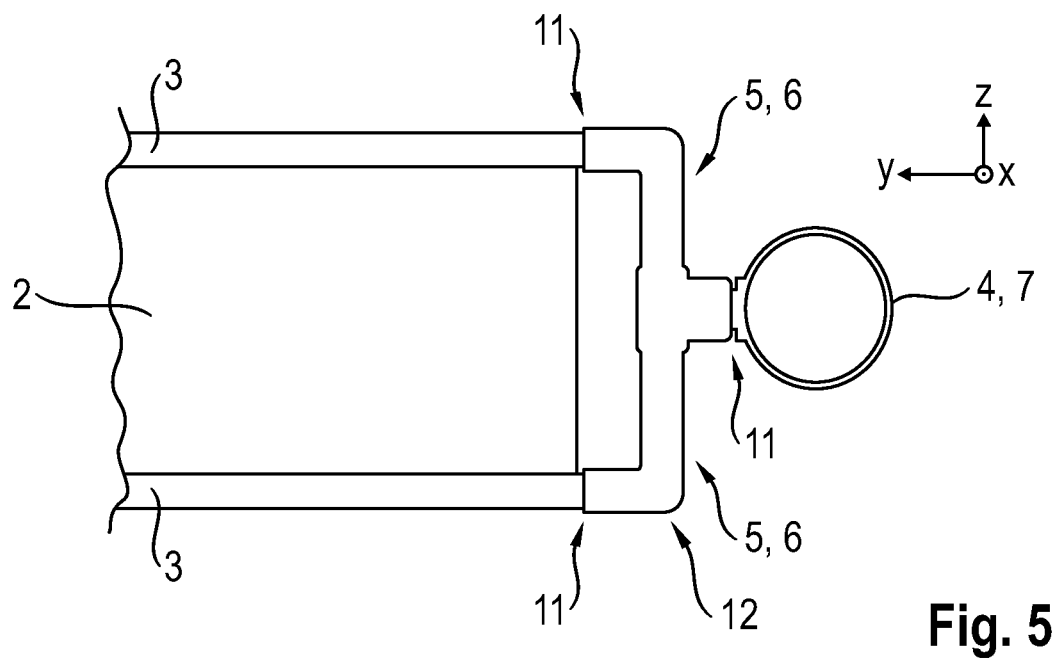
FIG. 5 shows, for the second exemplary embodiment, a view corresponding to that according to FIG. 4.

FIG. 5 shows, in relation to the second exemplary embodiment, a modification to the first exemplary embodiment to the effect that, instead of the respective multiple-part coolant distributor 12, a one-part coolant distributor 12 is used. Said one-part coolant distributor is in each case directly connected to the two heat sinks 3 and the coolant supply line 4 or the coolant discharge line 7 via the plug-in connections 11 and sealed off there. Here, the coolant distributors 12 consist of plastic and are designed, in particular, as an injection-molded part. Otherwise, reference is made in respect of this second exemplary embodiment to the above description of the first exemplary embodiment in order to avoid repetition.

What is claimed is:

1. A high-voltage battery comprising:
    a plurality of battery modules,
    coolant-carrying heat sinks for respectively cooling each battery module of the plurality of battery modules,
    supply connections disposed on one side of the battery modules for fluidly interconnecting the heat sinks to a coolant supply line, and
    discharge connections disposed on an opposite side of the battery modules for fluidly interconnecting the heat sinks to a coolant discharge line,
    wherein each of the supply connections and the discharge connections respectively form a coolant distributor, wherein the respective coolant distributor is connected to the heat sinks of the respective battery module, and
    wherein each coolant distributor for the supply connections includes a first port that is configured to be fluidly connected to the coolant supply line, a second port that is fluidly connected to one heat sink associated with one respective battery module of the plurality of battery modules, and a third port that is fluidly connected to another heat sink associated with said one respective battery module of the plurality of battery modules, and wherein the coolant distributors for the supply connections are positioned on said one side of the battery modules,
    wherein each coolant distributor for the discharge connections respectively includes a first port that is configured to be fluidly connected to the coolant discharge line, a second port that is fluidly connected to said one heat sink associated with one battery module of the plurality of battery modules, and a third port that is fluidly connected to said another heat sink associated with said one battery module of the plurality of battery modules, and wherein the coolant distributors for the discharge connections are positioned on said opposite side of the battery modules,
    wherein for each of the supply and discharge connections, the first port is positioned at an elevation between the heat sinks of the respective battery module.

2. The high-voltage battery as claimed in claim 1, wherein the respective coolant distributor is of one-part design.

3. The high-voltage battery as claimed in claim 1, wherein the coolant distributors and/or the coolant supply line and/or the coolant discharge line are composed of plastic.

4. The high-voltage battery as claimed in claim 1, wherein connection regions of the supply connections to the heat sinks and/or connection regions of the discharge connections to the heat sinks are arranged in the same spatial direction (y) or the same spatial plane (y, z).

5. The high-voltage battery as claimed in claim 1, wherein connection regions of the supply connections to the coolant supply line and/or connection regions of the discharge connections to the coolant discharge line are arranged in the same spatial direction (y) or the same spatial plane (y, z).

6. The high-voltage battery as claimed in claim 1, wherein the coolant distributors have a flexibly mounted connection region.

7. The high-voltage battery as claimed in claim 1, wherein the coolant distributors are connected to the heat sinks and/or the coolant supply line and/or the coolant discharge line by plug-in connections.

8. The high-voltage battery as claimed in claim 1, wherein the heat sinks are arranged on opposing sides of the respective battery module.

9. The high-voltage battery as claimed in claim 1, wherein the respective battery module has two heat sinks.

10. The high-voltage battery as claimed in claim 1, wherein the respective heat sink, through which coolant flows, is a plate heat exchanger.

11. The high-voltage battery as claimed in claim 1, wherein the supply connections and the discharge connections of the respective battery module are arranged on opposing sides of the battery module.

12. The high-voltage battery as claimed in claim 1, wherein the heat sinks of the respective battery module make surface-to-surface contact with said respective battery module.

13. The high-voltage battery as claimed in claim 1, wherein the heat sinks of the respective battery module are connected to said respective battery module.

14. The high-voltage battery as claimed in claim 1, wherein for each of the supply and discharge connections, the first port is positioned at an elevation between the second and third ports.

15. The high-voltage battery as claimed in claim 1, wherein a first length of the coolant supply line extends along one side of one of the battery modules and that first length of the coolant supply line is positioned at an elevation between the heat sinks of said one of the battery modules, a first length of the coolant discharge line extends along an opposite side of said one of the battery modules and that first length of the coolant discharge line is positioned at an elevation between the heat sinks, and wherein the first lengths of the coolant discharge line and the coolant supply line are positioned on a common plane.

16. The high-voltage battery as claimed in claim 1, wherein for each of the supply and discharge connections, the coolant supply line and the coolant discharge lines are each positioned at an elevation between the heat sinks of the respective battery module.

17. The high-voltage battery as claimed in claim 1, wherein each first port is a plug-in connection.

18. The high-voltage battery as claimed in claim 1, wherein each of the second and third ports comprise angled connectors for connecting to said one heat sink and said another heat sink, respectively.

19. The high-voltage battery as claimed in claim 1, wherein the first ports of the supply connections are spaced apart along a length dimension of the coolant supply line.

20. The high-voltage battery as claimed in claim 1, wherein for each of the supply and discharge connections, the second port extends to an elevation above the first port and the third port extends to an elevation beneath the first port.

* * * * *